(12) United States Patent
Hollingshead

(10) Patent No.: US 6,260,581 B1
(45) Date of Patent: *Jul. 17, 2001

(54) APPARATUS FOR ASSEMBLING MODULAR CHEMICAL DISTRIBUTION SUBSTRATE BLOCKS

(76) Inventor: J. Gregory Hollingshead, 1304 Verdant Way, Austin, TX (US) 78746

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,522

(22) Filed: Jun. 12, 1998

(51) Int. Cl.[7] ........................................... F16K 1/00
(52) U.S. Cl. ............................................ 137/884; 137/271
(58) Field of Search .................................. 137/269, 271, 137/270, 884

(56) References Cited

U.S. PATENT DOCUMENTS

| | | |
|---|---|---|
| 2,927,602 | 3/1960 | Eklund . |
| 3,215,158 * | 11/1965 | Bass et al. ........................... 137/269 |
| 3,234,963 | 2/1966 | Lyon . |
| 3,407,834 | 10/1968 | Brandenberg . |
| 3,457,943 | 7/1969 | Kawabata . |
| 3,504,704 * | 4/1970 | Beckett et al. ....................... 137/269 |
| 3,654,960 * | 4/1972 | Kiernan ............................... 137/271 |
| 3,747,623 | 7/1973 | Greenwood et al. . |
| 3,756,274 * | 9/1973 | Wolfgramm . |
| 3,915,194 | 10/1975 | Friedrich . |
| 4,080,983 | 3/1978 | Stumpmeier . |
| 4,082,324 * | 4/1978 | Obrecht ............................... 137/271 |

(List continued on next page.)

FOREIGN PATENT DOCUMENTS

| | | |
|---|---|---|
| 87 05 514 U * | 7/1987 | (DE) . |
| 88 06 751 U * | 9/1988 | (DE) . |
| 295 14 348 | 11/1995 | (DE) . |
| 0 169 963 | 2/1986 | (EP) . |
| 0 844 424 | 5/1998 | (EP) . |
| 2122225 | 8/1972 | (FR) . |
| 2227489 | 11/1974 | (FR) . |
| WO 98/25058 | 6/1998 | (WO) . |

OTHER PUBLICATIONS

Cestari et al. The Next Step in Process Gas Delivery: A Fully Integrated System p. 79.

CKD/Tylan General New Integrated Gas System (advertisement).

SEMI Draft Doc. 2787 "Specification For Surface Mount Interface of Gas Distribution Components," before Jun. 1998, 1 page.

SEMI Draft Doc. 2787.1 "Specification For Surface Mount Interface of Gas Distribution Components–Counterbore Design," before Jun. 1998, 2 pages.

Primary Examiner—S. Thomas Hughes
Assistant Examiner—Steven Blount
(74) Attorney, Agent, or Firm—Conley, Rose & Tayon, PC; Robert C. Kowert

(57) ABSTRACT

An apparatus for mechanically connecting modular chemical delivery substrate blocks in single layer and/or multiple lower layer configurations via axial and intermediate locations in such a way that all joint locations (including mounting fixtures to a rigid mechanism for mounting purposes) are completely accessible from the top surface of the assembly for fastening or unfastening the joints of the blocks. A design using the method of the present invention and incorporating current semiconductor standards (such as SEMI 2787) dictates specific mechanical dimensions and fastener localities in order to be properly implemented. Use of this top access fastener design results in minimal numbers of substrate joints in a chemical delivery system being affected when removing any one block from the system.

21 Claims, 11 Drawing Sheets

U.S. PATENT DOCUMENTS

| | | |
|---|---|---|
| 4,136,713 | 1/1979 | Humphreys . |
| 4,224,957 | 9/1980 | Darves et al. . |
| 4,392,677 | 7/1983 | Hardouin . |
| 4,415,004 | 11/1983 | Bouteille et al. . |
| 4,488,343 | 12/1984 | Kobelt . |
| 4,921,072 | 5/1990 | Divisi . |
| 5,285,814 | 2/1994 | Pettersson et al. . |
| 5,488,925 | 2/1996 | Kumada . |
| 5,529,088 * | 6/1996 | Asou ................................... 137/271 |
| 5,605,179 | 2/1997 | Strong, Jr. et al. .................. 137/884 |
| 5,662,143 | 9/1997 | Caughran . |
| 5,769,110 | 6/1998 | Ohmi et al. . |
| 5,819,782 | 10/1998 | Itafuji .................................. 137/240 |
| 5,836,355 | 11/1998 | Markulec et al. . |
| 5,860,445 | 1/1999 | Yoshimura et al. . |
| 5,860,676 | 1/1999 | Brzezicki et al. . |
| 5,904,381 | 5/1999 | Ohmi et al. . |

* cited by examiner

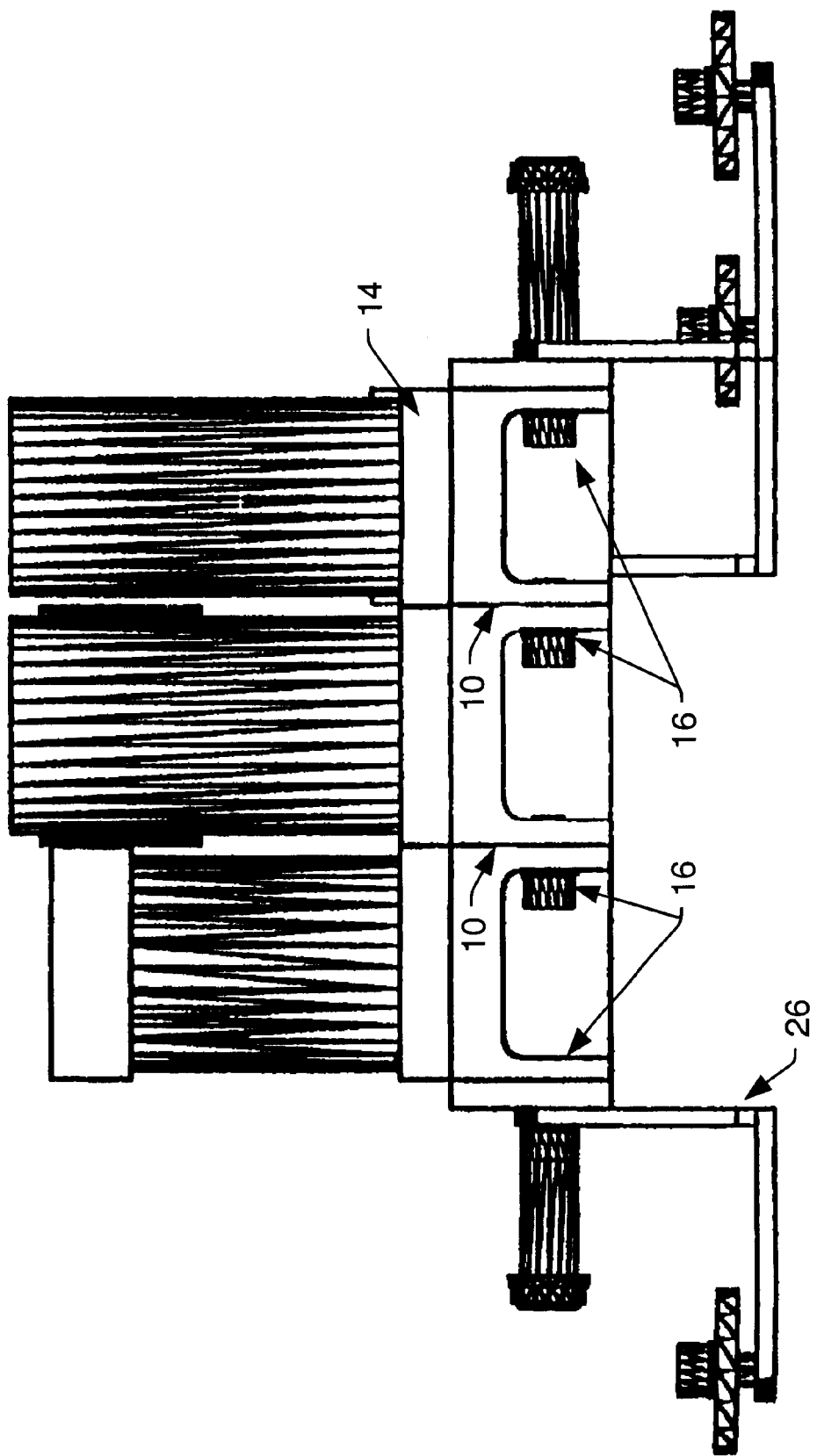

APPARATUS FOR ASSEMBLING MODULAR CHEMICAL DISTRIBUTION SUBSTRATE BLOCKS

BACKGROUND OF THE INVENTION

1. Field of the Invention

This invention pertains to modular chemical distribution substrate block designs used in the semiconductor industry and, more particularly, to the mechanical features of the substrates and their modular components, their accessibility from top surfaces for assembly and disassembly, and the specific mechanical dimension requirements of such substrate block design.

2. Description of Related Art

In the semiconductor industry and well as in other industries, modular gas substrates are used for directing and controlling the flow of gas reactants and other chemicals (i.e. liquids). Through the use of truly modular substrates and components, not only can worn components be more easily replaced but also the design of the gas delivery system can be changed. For example, in chemical etch processes, there are demanding requirements for quickly changing out gas lines periodically due to corrosion of the lines, and/or to partially or completely reconfigure the etch system during maintenance. FIG. 1A shows a prior art system for an etch process tool used in the semiconductor fabrication industry. Conventional methodology for providing such gas paths uses stainless steel conduit or tubing 11 (typically ¼" O.D., ⅜" O.D., or ½" O.D.), which is welded between each gas controlling component 13. Such conventional technology has the disadvantages of taking too much time to change-out or repair components 13 and being costly to reconfigure the conduit (tubing) path 11. Therefore, truly modular blocks for use in these applications are desired and needed.

Although for years Asian and United States suppliers of such modular chemical delivery substrates have used a variety of methods for bolting or otherwise fastening together modular substrate blocks, no previous approach to date has addressed the need for entirely top accessible components for particular applications. For example, FIG. 1B is a diagram of a prior art modular substrate design whereby the individual blocks 14 are fastened together with horizontal, full length bolts 12, 30 throughout an entire assembly 15 of blocks 14. Although this prior art system can be assembled rather quickly (typically only two 2-inch bolts per axial connection), problems with this design raise several safety, disassembly and repair concerns.

One such problem with the prior art system in FIG. 1B is the amount of deflection of the long bolts 12 when subjected to the torque required to provide appropriate sealing integrity between the substrate sealing joints 17. Effectively, the basic deflection force of a bolt 12 can be calculated with the following formula: DEFLECTION=PL/AE, wherein P is the amount of force load upon an axial connection of any adjoining blocks 14 in series (the deflection potential), L is the length of the bolt 12, A is the cross-sectional area of the bolt 12, and E is the modulus of elasticity of the bolt 12 based on its material composition. If it is assumed that all equipment suppliers of such modular substrate technology use 300 series or better materials for the fastener components, then E is a constant for any length bolt 12. Likewise, in these types of modular gas system designs, typically the designer is mechanically constrained to using fastener diameters of ¼" (6.35 mm) or smaller, and thus A can be considered relatively constant. In summary, if A and E are constant, then as the designer increases the length of the bolt 12 L, there will be a corresponding linear increase in the deflection force of the bolt 12 which is conveyed to the fastened substrate joints. If the deflection force is high enough, it may cause a potential seal integrity loss at the axial (joint-to-joint) connections 17. Another concern with the extended length fastener design shown in FIG. 1B is the fact that if a user were to require removal of any one substrate block 14 in the long fastener assembly 15, the entire assembly 15 and respective sealing joints 17 would be exposed to atmosphere. This problem presents a potential safety and contamination issue with corrosive and toxic chemical delivery applications.

FIG. 1C is a drawing of another prior art modular substrate design whereby the individual blocks 14 are fastened together via localized bolting of each substrate-to-substrate or axial joint connection 16, and the entire assembly is connected te mounting brackets 26. This, design dramatically reduces or eliminates the concern for deflection potential by localizing fastener sealing strength, integrity, and length. Use of such a localized fastener design also reduces the number of sealing joints 10 exposed to atmosphere for any given substrate block 14 within the assembly. However, the localized fastener substrate joining design shown in FIG. 1C also has a limitation regarding disassembly. Referring now to FIG. 1D, which depicts a top view of the substrate design shown in FIG. 1C, if the user were to place multiple substrate assemblies side-by-side (typically on 1.6" (40.64 mm) to 2" (50.8 mm) spacing), many of the axial fasteners 18 as shown in FIG. 1D cannot be accessed because the fastener locations lie under the top accessible surface of the blocks 14. Clearly, a method of assembling the substrate blocks which overcomes the disadvantages of the prior art is needed.

SUMMARY OF INVENTION

The present invention overcomes the disadvantages of the prior art by providing a method for mechanically connecting and disconnecting modular chemical delivery substrate blocks in single layer and/or multiple lower layer configurations via axial and intermediate locations in such a way that all joint locations (including mounting fixtures to a rigid mechanism for mounting purposes) are completely accessible from the top surface of the assembly for fastening or unfastening the joints of the blocks. A design using the method of the present invention and incorporating current semiconductor standards (such as SEMI 2787) dictates specific mechanical dimensions and joining localities in order to be properly implemented. Use of this top access fastener design results in minimal numbers of substrate joints in a chemical delivery system being affected when removing any one block from the system.

Further objects and advantages of the invention will become apparent from a consideration of the drawings and ensuing description.

BRIEF DESCRIPTION OF THE DRAWINGS

FIG. 1C is cross sectional view of another prior art modular substrate design using localized bolting of individual blocks to each other.

DETAILED DESCRIPTION OF PREFERRED EMBODIMENT

Figure 2A:
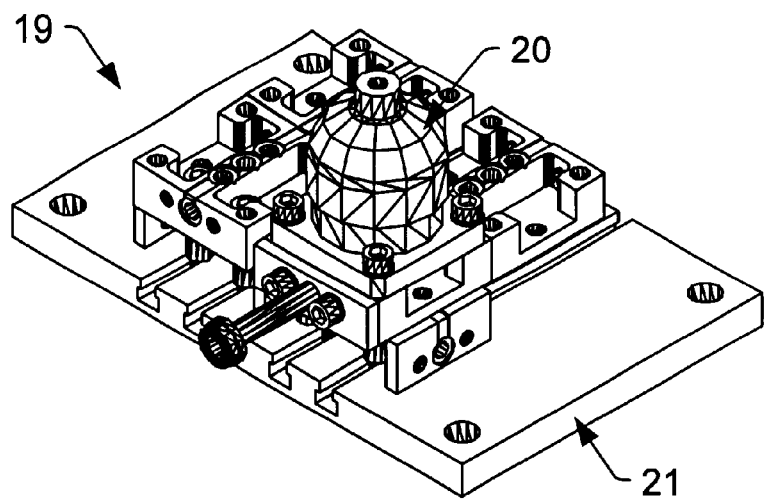
FIG. 2A is a perspective view of the entire top access assembly typical in the modular chemical delivery substrate design of the present invention.
Figure 2B:
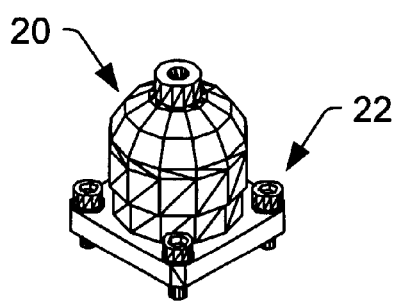
FIG. 2B is an exploded, perspective view showing the removal of a typical surface mount chemical control component by access from the top according to the present invention.
Figure 2B:
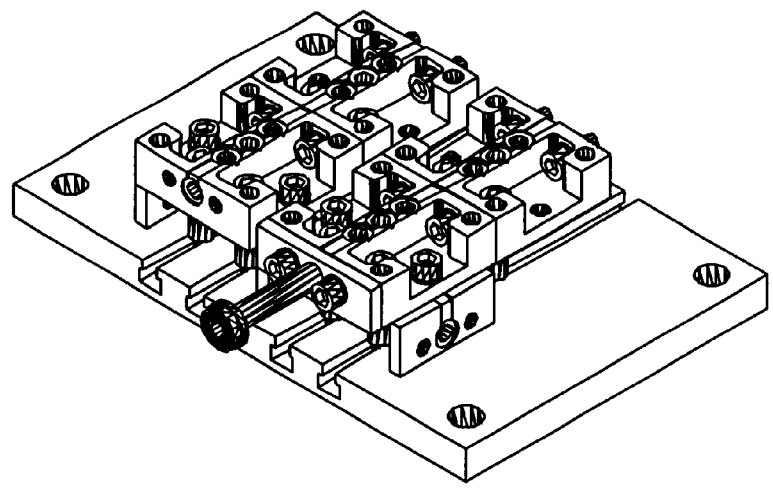

SEMI standard 2787.1 sets forth the industry standard for the mechanical interface for surface mount components used in a modular chemical delivery system. It states that all surface mount components in such a system must be removable via 4-inch mounting screws from the top of the chemical delivery system. Likewise, SEMI 2787.1 dictates the top mechanical chemical gas delivery mounting hole locations, the gas path bore centerline locations, and the gas seal porting locations. FIG. 2A is a view of what a typical assembly 19 using the method of the present invention might look like with the surface mount chemical control component 20 affixed in place on the assembly 19. It can be seen that the top access assembly 19 is composed of multiple layers starting with the mounting palette layer 21 and ending with the chemical control component 20 on top. FIG. 2B is a view showing a typical modular chemical control component 20 once it is removed with a wrench from the top surface of the assembly 19 by loosening the fasteners 22. Based on industry standards such as SEMI 2787.1 and the other constraints mentioned above, the following method to permit access to and removal of all components down to the mounting palette 21 from above the system assembly shall be described herein.

Figure 1A:
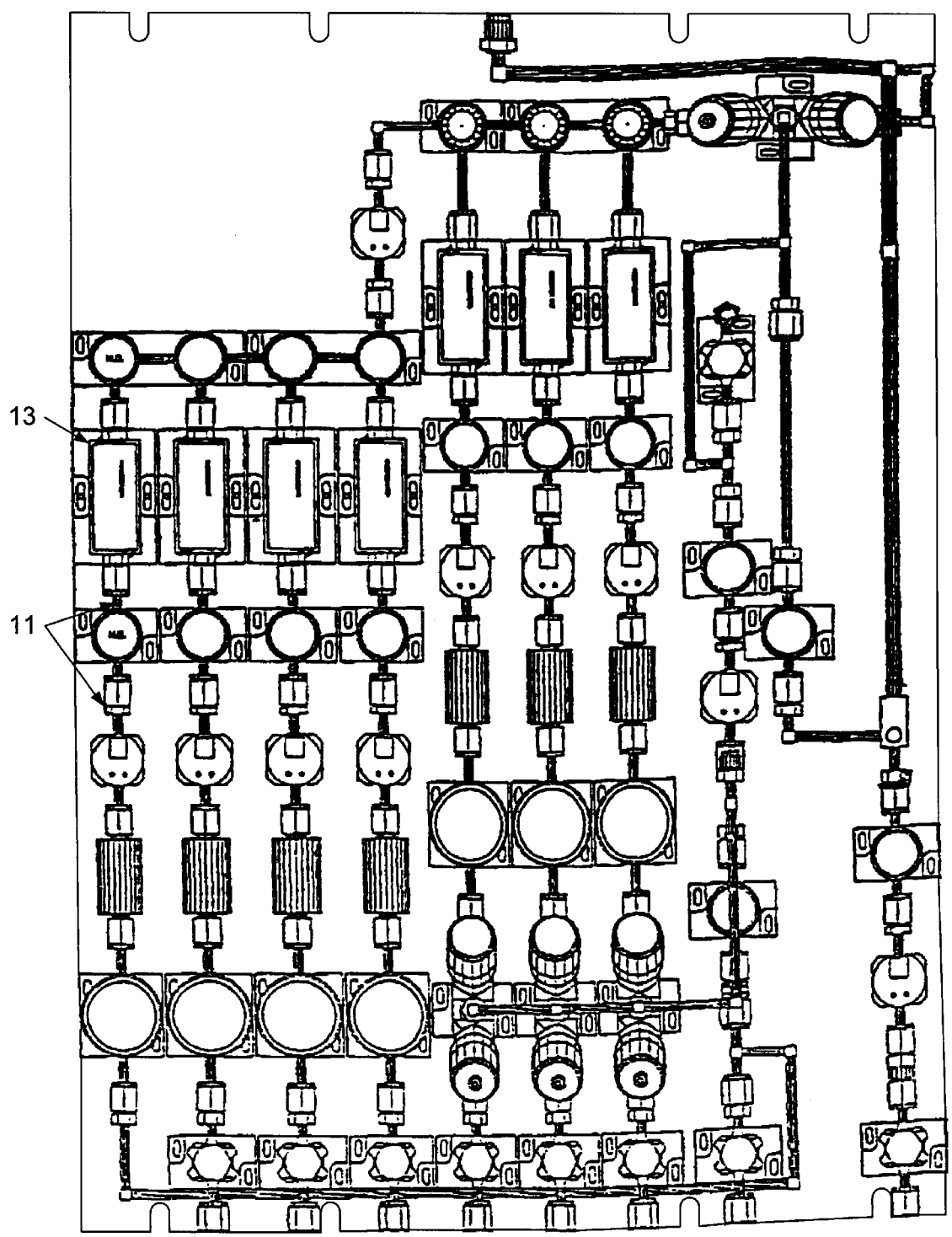
FIG. 1A is a top view of a prior art modular substrate design for an etch process tool.
Figure 2C:
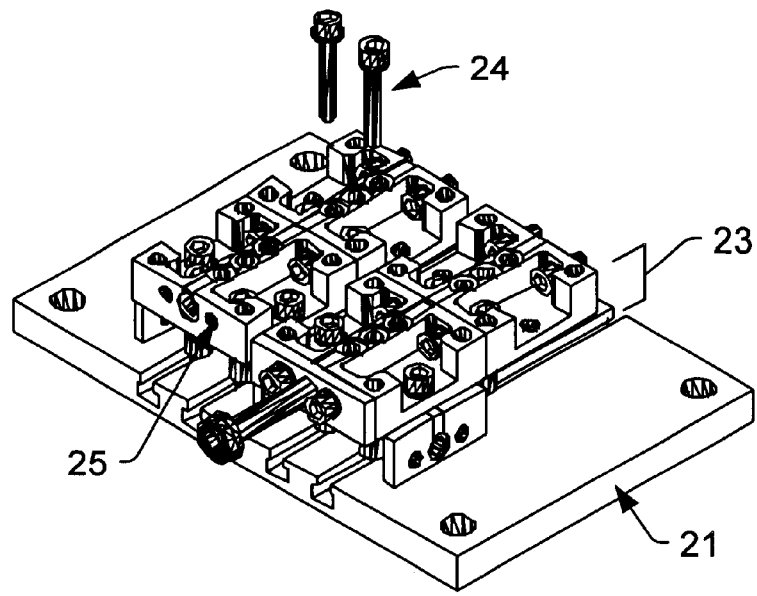
FIG. 2C is a perspective view showing the removal of the typical modular substrate block mounting hardware that fixes the system about a mounting bracket.

After removal of the top surface mount chemical control component 20 shown in FIG. 2B, the next step of the present invention is to permit either total or partial removal of the sub-system mounting hardware 23 via access exclusively from the top of the assembly(as shown in FIG. 2C). This mounting hardware 23 must be strategically placed such that mechanical interference with multiple layer substrate systems is avoided. Likewise, mechanical interference with adjacent gas paths must also be avoided. This method of mounting modular blocks 25 to a mounting palette 21 is unique in that the fasteners 24 are all easily accessible from the top surface of the blocks, 25, and it does not require mounting brackets to attach the blocks 25 to the palette 21 as shown in prior art designs, such as in FIG. 1C.

Figure 2D:
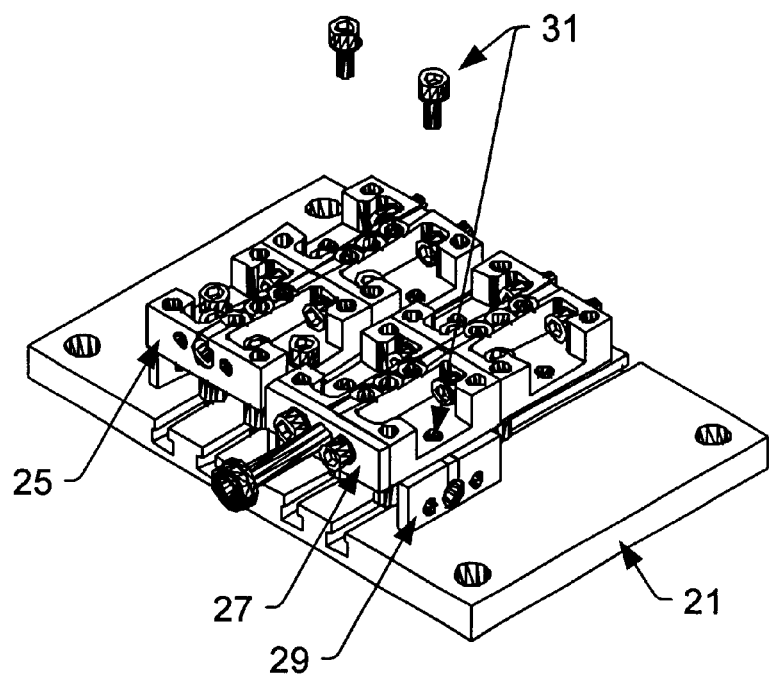
FIG. 2D is a perspective view of the removal of top-accessible mounting screws securing top-to-bottom substrate fastening joint interfaces.
Figure 2E:
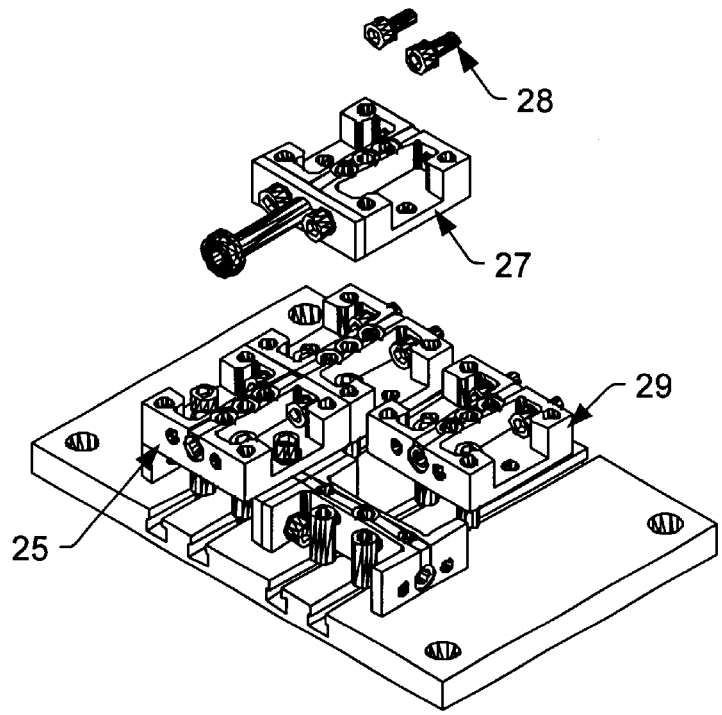
FIG. 2E is an exploded, perspective view showing typical top and bottom component modular chemical delivery substrate blocks utilizing the layout of the mounting techniques of the present invention.

FIGS. 2D and 2E show the removal of subsequent modular blocks 25 according to the method of the present invention. First, as shown in FIG. 2D, top-to-bottom block connection fasteners 31 are removed from above the assembly so that the top block 27 can be detached from the underlying bottom block 29. Alternatively, if the last layer of the assembly is being removed, then the top block 27 is detached from the mounting palette 21 itself. Moving on to FIG. 2E, the next step requires removal of any side-to-side fasteners 28 to disconnect the top block 27 from the adjacent block 30. This process can be repeated for connecting and disconnecting any number of blocks and layers of blocks, all through access from above each block 25.

Figure 1B:
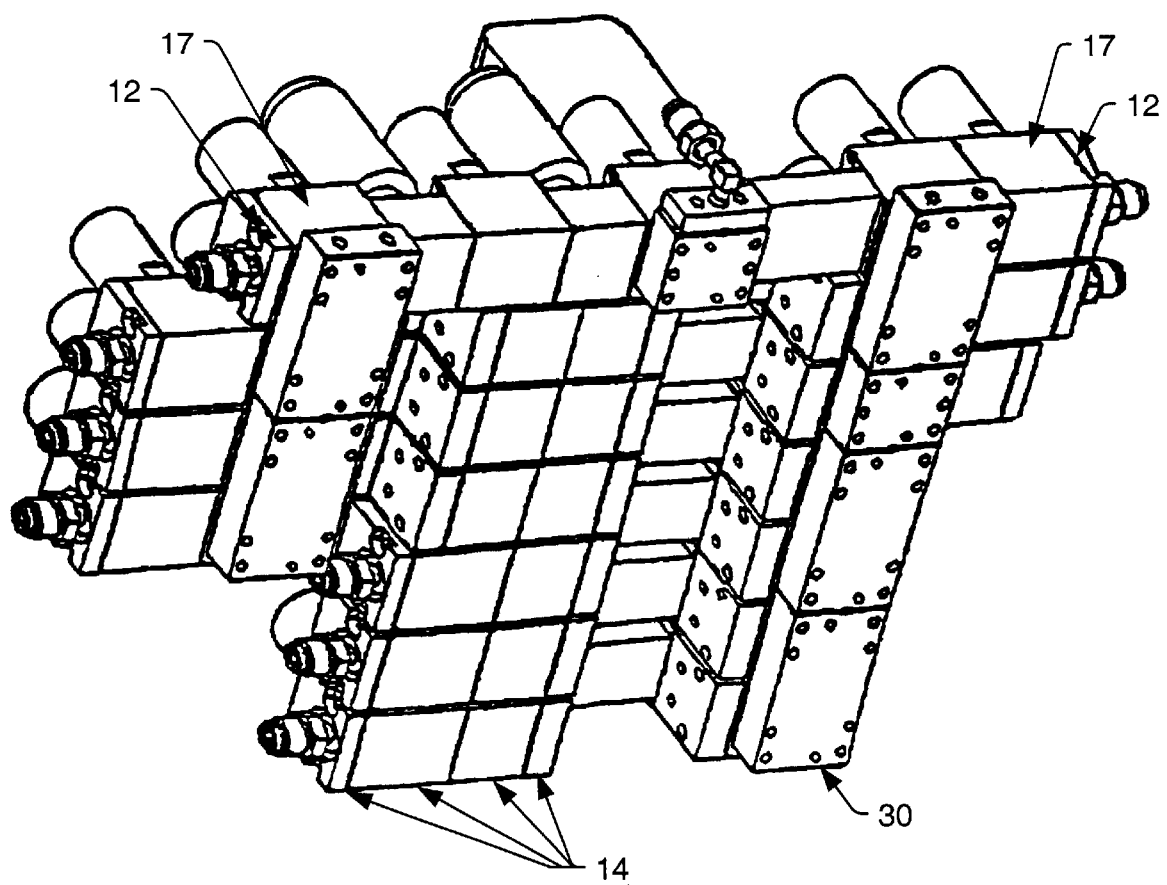
FIG. 1B is a perspective view of a prior art modular substrate design using fill length bolts to fasten individual substrate blocks together.
Figure 1D:
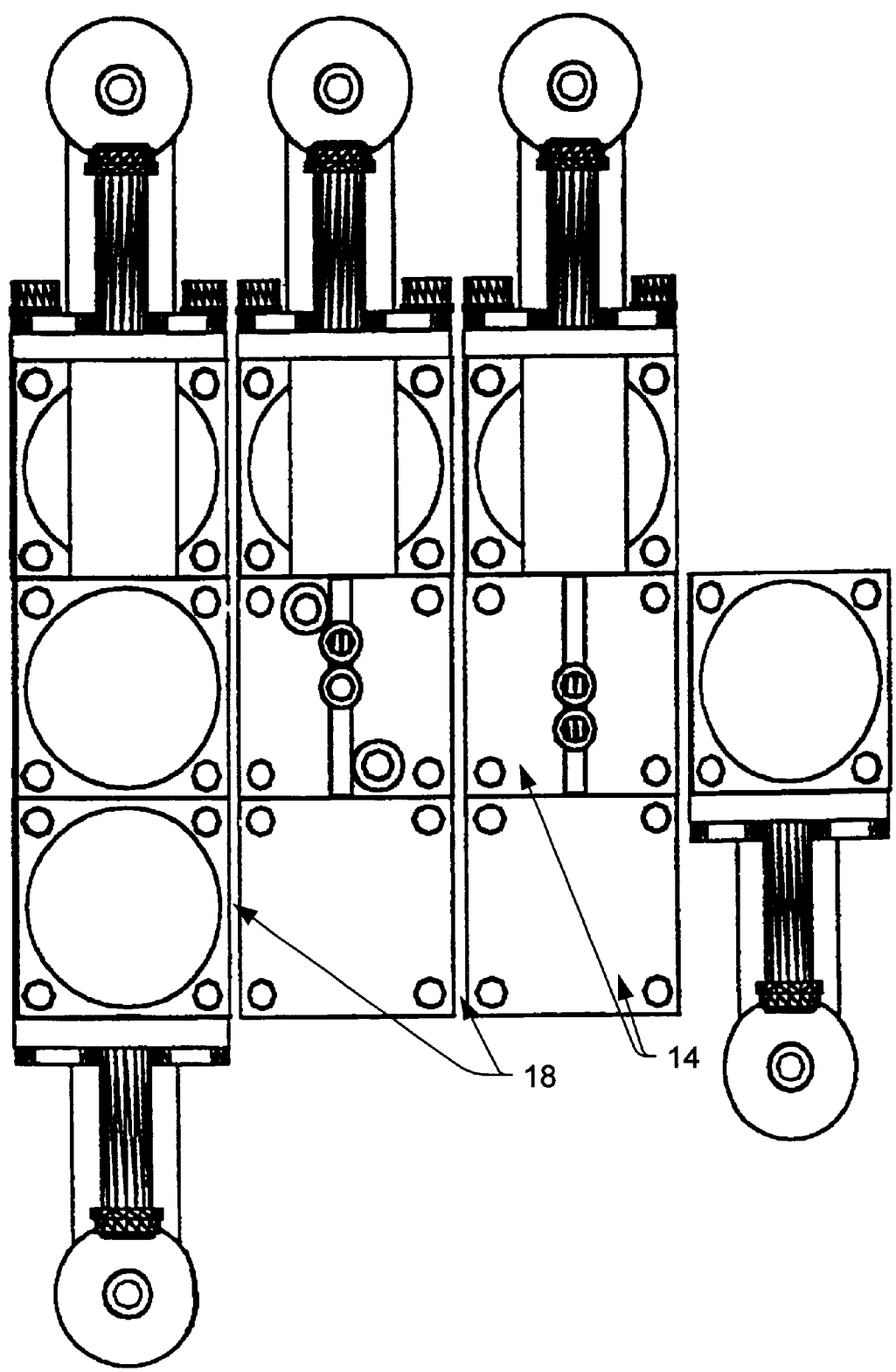
FIG. 1D is atop view of the substrate design shown in FIG. 1C.

One can access all top axial substrate blocks 25 (whether single or multiple layer configurations) via the top surface of the assembly and remove such substrate blocks 25 from the assembly. by using the proper fastener tool, the fasteners 28 are accessible from the top surface of the assembly and easily removed by the user. The advantage of the method of the present invention over prior art methods is now clear. For example, the full length fastener technique shown in FIG. 1B does not, permit access from the top surface in single or multiple layer configurations. Similarly, the prior art localized axial fasteners shown in FIG. 1D cannot be accessed via the top surface when multiple substrate blocks are mounted in close proximity to each other, i.e., in parallel as is typically required in many applications.

Figure 2F:
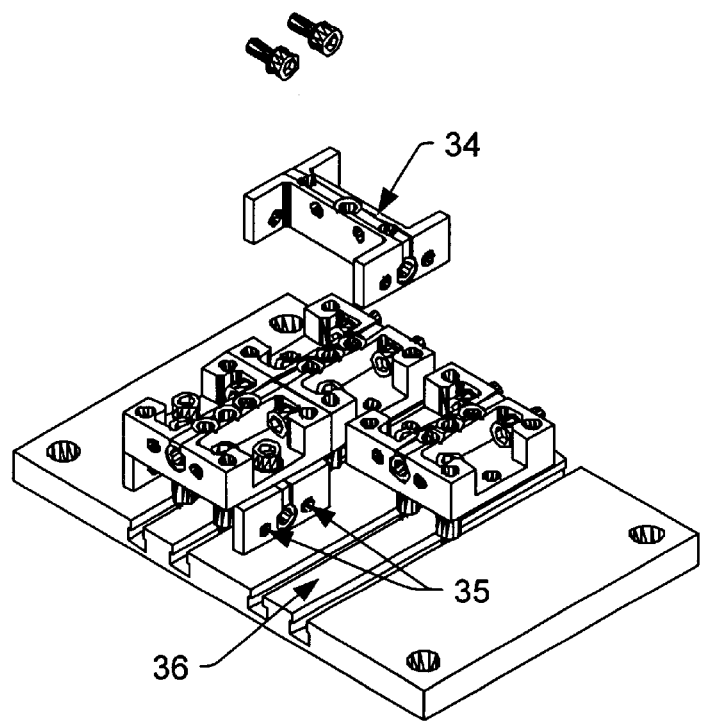
FIG. 2F is an exploded, perspective view of a typical substrate assembly once all the top and subsequent accessible components have been removed from the assembly thereby exposing the system to the mounting palette layer.

Referring now to FIG. 2F, removal of all bottom layer substrate blocks 34 via the top surface access method of the present invention including disconnecting the substrate blocks at their respective axial connection fastener locations 35. In contrast, the ability to remove any layer(s) of blocks via top access of the prior art design of FIG. 1B requires removal of the entire assemblies from the ends of the system and often results in exposing the entire system to atmosphere. The ability to remove all lower level (dual or multiple layer) blocks until one has removed the entire multi-layer assembly down to the mounting palette via access from the top surface of the system is an advantage in assembly, disassembly, and reconfiguration of these modular chemical distribution systems. Further, this approach permits removal of an entire single or multiple layer substrate block assembly portion of the chemical delivery system from the top working portion of the system with minimal exposure of the system blocks to atmospheric conditions (a known source for contamination of the internal system).

Figure 3A:
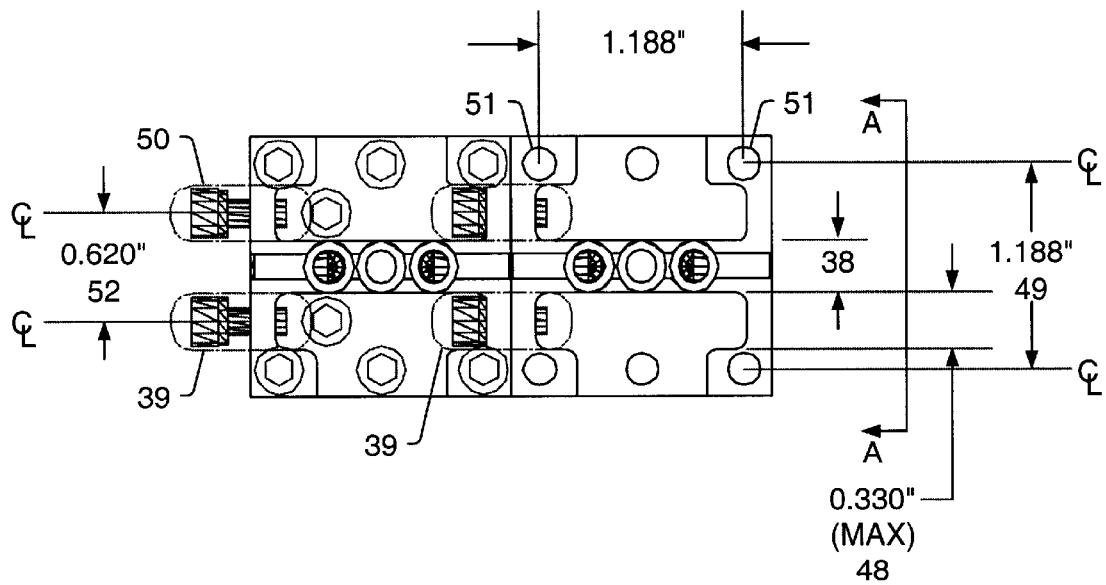
FIG. 3A is a top view of a substrate block assembly in accordance with the design parameters of the present invention.
Figure 3B:
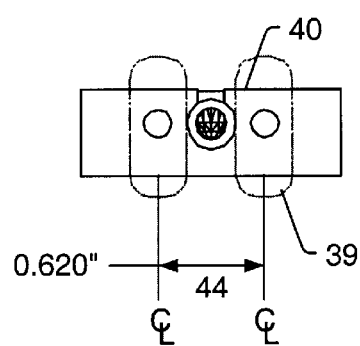
FIG. 3B is a cross sectional view of the substrate block assembly of FIG. 3A taken along line A—A.
Figure 3C:
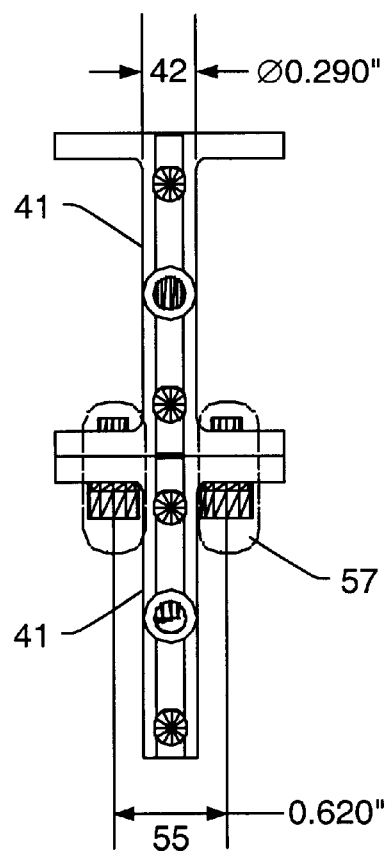
FIG. 3C is a top view of the bottom axial connection for a bottom substrate in accordance with the design of the present invention.

Further mechanical variations based on the process described above can be implemented. In accordance with SEMI 2787.1, it is clear that no mechanical interference with regard to the placement of the fastener locations and hardware sizes of the axial connections of the substrate blocks can be permitted without falling outside the standard. Thus, in order to achieve the top access design disclosed herein, one must locate the fastener hardware for all axial (top and subsequent multi-layer axial) connections in strategic locations within the assembly. Specifically, as shown in FIG. 3A, SEMI Standard 2787.1 requires a0.290" (7.36 mm) sealing interface diameter 38 on the top surface of the substrate designs and at both top surface axial connections 40 shown in FIG. 3B, and bottom axial connections 42 shown in FIG. 3C. Thus, one is restricted to areas 39 within these mechanical boundaries for clearance as shown by the dotted lines in FIGS. 3A, 3B and 3C. In particular, for a typical three port top block/substrate as shown in FIG. 3B, the center-to-center spacing 44 and 52 of the top axial fasteners 50 is 0.620". For a bottom block substrate as shown in FIG. 3C, the center-to-center spacing 55 for the bottom axial fasteners 57 is again 0.620". Secondly, one cannot violate the interference and/or structural integrity of the system by allowing too much milling of the areas near the mounting hole specifications as dictated in SEMI 2787.1 without causing potential structural mechanical failure of such mounting hole screws. Specifically, the maximum distance 48 between the mounting hole 51 and the edge of the interface diameter 38 is 0.3341 . Based on these restraints, one must use top access axial connection locations which do not violate the top 0.29041 (7.36 mm) diameter 38 on the top sealing port (1, 2, or 3 port locations), and the respective top component mounting hole locations 51 (1.188" (30.2 mm)) as shown in the dotted line quadrant areas 39 depicted in FIG. 3A. The resulting center-to-center axial fastener dimensions 52 must therefore be a minimum of 0.620, as shown in FIG. 3A.

Since all top and subsequent lower layer (multi-layer) blocks 41, as shown in FIG. 3C, must not violate similar axial center seal locations in the center of the blocks while still utilizing a 0.290" (7.36 mm) diameter seal counter bore, one can surmise that the center-to-center mounting hole distance for these blocks 41 must maintain a minimum distance 54 of 0.620" (15.74 mm). This dimension is secondarily dictated by the quadrant area 39 restraints mentioned above in connection with FIG. 3A.

Figure 3D:
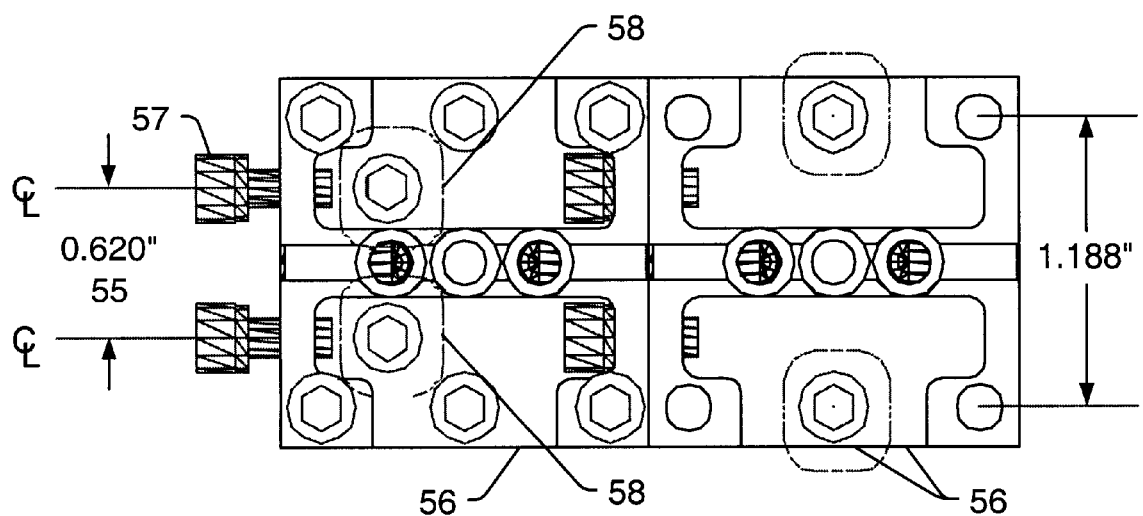
FIG. 3D is a top view of a substrate block that is attached to a mounting fixture using the method of the present invention.

Based on the requirements previously stated, the proper locations for mechanically mounting (via mounting hardware) single or multi-layer substrate assemblies to a mounting fixture via the top-only access method can be determined. As shown in FIG. 3D, the axial fastener locations for the top layer substrate blocks must be placed so as to prevent mechanical interference by lower level blocks and avoid mechanical interference with the intermediate mounting fasteners 56 (when connecting top to bottom blocks) which are located on 1.188" centers. The only locations for placing mounting fastener holes in the top surface block(s)/substrate(s) are within the quadrants 58 (delineated by dotted lines) shown in FIG. 3D. Thus, the mechanical dimension of 0.620" (15.74 mm) for the center-to-center mounting hardware hole location distance 55 should be used for this design.

Figure 4A:
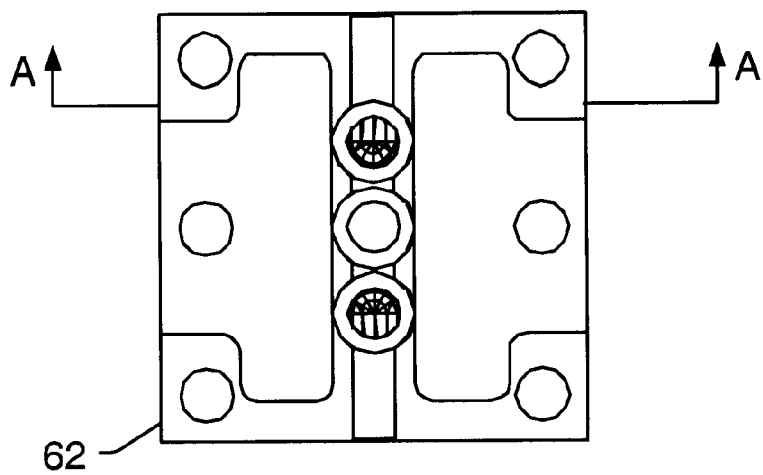
FIG. 4A is a top view of one of the substrate blocks shown in FIG. 3D.
Figure 4B:
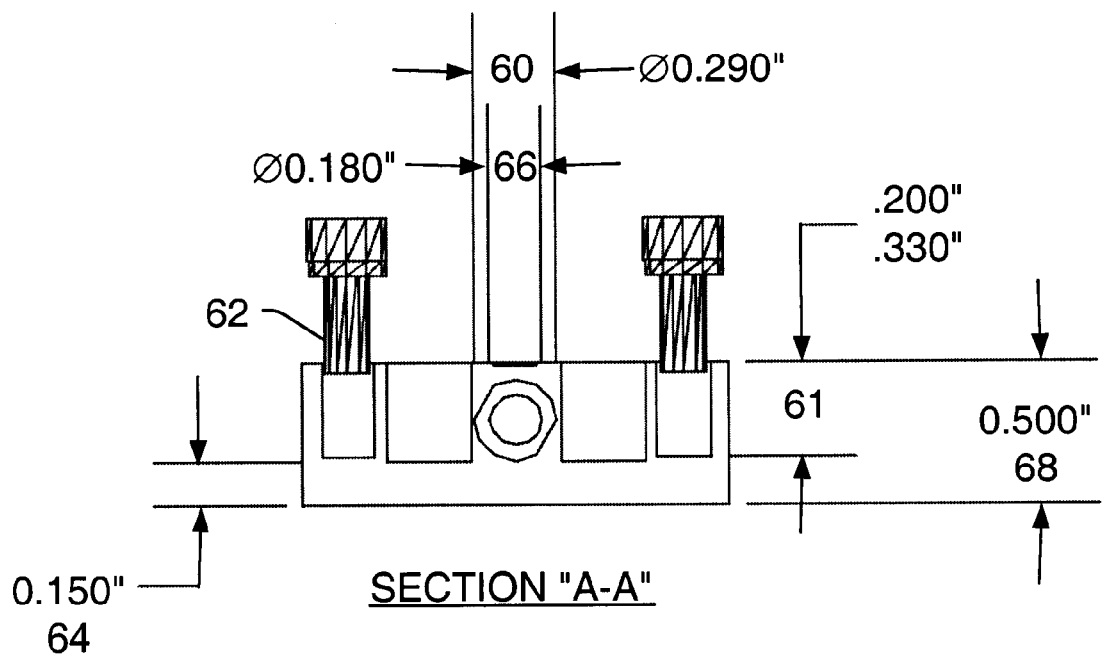
FIG. 4B is a cross sectional view of the substrate block of FIG. 4A taken along line A—A.

Additional mechanical restrictions further define this invention. FIGS. 4A and 4B display a substrate block on a typical top layer substrate with an axial seal connection in top and cross sectional views respectively. The requirements to provide a 0.290" (7.36 mm) sealing counter bore diameter 60, a safe clearance margin 61 of 0.200–0.330" (5.08 mm–7.62 mm) for the depth of the four four-inch threaded top surface mount chemical delivery component mounting fasteners 62 from the top surface, and a 0.150" mechanical interface flange 64 (for mounting top to lower layer substrates) dictate the following: by utilizing a 0.290" (7.36 mm) axial connection seal (cavity) geometry 60 with a 0.180" (4.57 mm) bore diameter 66 for the wetted chemical delivery flow path having a 0.150" fastening interface flange 64 between top and bottom layer substrate connections, and utilizing a top surface threaded screw tap depth 61 of 0.200–0.330" (5.08 mm–7.62 mm) (a recommended safety measure to prevent over-travel of the top surface component fastener screws), a mechanical top layer substrate depth 68 of 0.500" is dictated. These dimensions avoid compromising the mechanical structure of the device under required loads/torque of the fastened joint structure(s).

Figure 4C:
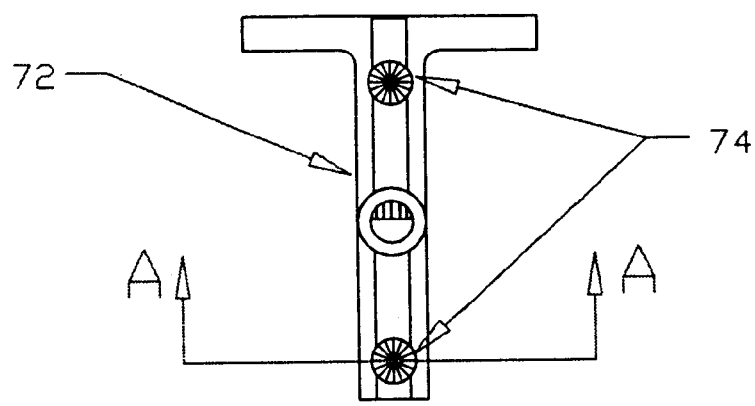
FIG. 4C is a top view of a typical lower layer substrate plane using the method of the present invention.
Figure 4D:
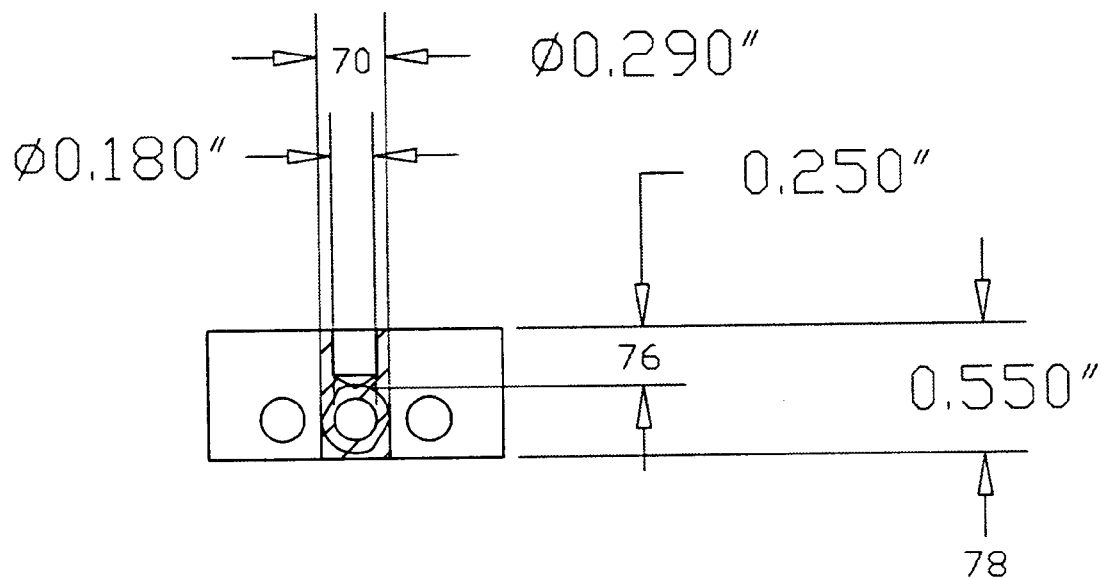
FIG. 4D is a cross sectional view of the substrate plane of FIG. 4C taken along line A—A.

Referring now to FIG. 4C and 4D, a typical lower layer substrate plane 72 with an axial seal cavity connection is shown. The ability to provide a 0.290" (7.36 mm) sealing counter bore diameter 70 on the axial sealing joint, coupled with a 0.180" (4.57 mm) wetted path chemical delivery bore dimension 71 while providing a safe clearance margin 76 for the depth of both two-inch threaded taps 74 at 0.250" (6.35 mm) maximum all without violating the conventional wetted chemical flow path wall thickness of 0.035" (0.889 mm) used to attach top layer substrates to the subsequent lower level substrate via their respective fasteners and tapped hole locations dictates a mechanical depth of all subsequent layers (bottom layers) at a minimum dimension 78 of 0.550" (13.97 mm).

While this invention has been described with an emphasis upon certain preferred embodiments, variations in the preferred composition and method may be used and the embodiments may be practiced otherwise than as specifically described herein. Accordingly, the invention as defined by the following claims includes all modifications encompassed within the spirit and scope thereof.

What is claimed is:

1. A modular chemical delivery block, comprising:
    a chemical delivery flow path;
    a top surface comprising a top bore hole for the chemical delivery flow path and configured to interface with a chemical control component or another chemical delivery block; and
    a side comprising an axial bore hole to the chemical delivery flow path and a pair of axial connection locations for receiving local side-to-side fasteners for connecting the modular chemical delivery block to another immediately adjacent modular chemical delivery block, wherein each of the axial connection locations comprises an interior opening defined in an interior side surface and an exterior opening defined in an exterior side surface, and wherein the interior opening of each of the pair of axial connection locations is unobstructed by other portions of the modular chemical delivery block so that local side-to-side fasteners are insertable into and removable from each of the axial connection locations from directly above said top surface;
    wherein the modular chemical delivery block is configured to be assembled with or removed from one or more other side-adjacent modular chemical delivery blocks by access from only directly above said top surface; and
    wherein the modular chemical delivery block is configured to mount to a vertically adjacent chemical delivery block.

2. The modular chemical delivery block as recited in claim 1, wherein the top surface further comprises:
    mounting holes for receiving top-to-bottom fasteners for mounting the modular chemical delivery block to the vertically adjacent chemical delivery block, and wherein said mounting holes for receiving top-to-bottom fasteners are configured so that the top-to-bottom fasteners are removable by access from directly above said top surface.

3. The modular chemical delivery block as recited in claim 1, wherein the pair of axial connection locations are arranged on opposite sides of the axial bore hole.

4. The modular chemical delivery block as recited in claim 1, wherein the modular block is configured to be mounted to a mounting palette arranged beneath the modular block without the use of a separate mounting bracket.

5. The modular chemical delivery block as recited in claim 1, wherein the modular chemical delivery block is further configured such that when the local side-to-side fasteners are fully inserted through each of the pair of axial connection locations, a head of each of the fasteners is adjacent the interior side surface.

6. The modular chemical delivery block as recited in claim 1, wherein the modular chemical delivery block is further configured such that when the local side-to-side fasteners are fully inserted each of the pair of axial connection locations, a shank of each of the fasteners extends through each of the pair of axial connection locations and out the exterior opening of each of the pair of axial connection locations.

7. The modular chemical delivery block as recited in claim 1, wherein the chemical delivery flow path extends from the exterior side surface in a first direction along a first axis and is configured to provide chemical delivery in the first direction, and wherein each of the pair of axial connection locations is configured to receive the local side-to-side fasteners oriented in the direction of the first axis for coupling the modular chemical delivery block to the immediately adjacent modular block along the first axis.

8. The modular chemical delivery block as recited in claim 1, further comprising a chemical delivery flow path wall extending from the interior side surface in a first direction of the chemical delivery flow path and surrounding a portion of the chemical delivery flow path, wherein a width of the chemical delivery flow path wall is less than a width of the side such that a void is defined adjacent the interior side surface and the chemical delivery flow path wall.

9. The modular chemical delivery block as recited in claim 1, wherein a length and a width of the modular chemical delivery block are approximately equal.

10. The modular chemical delivery block as recited in claim 1, wherein said modular chemical delivery block is configured to be fastened to the immediately adjacent modular block with the local side-to-side fasteners having a length less than a length of the modular chemical delivery block.

11. The modular chemical delivery block as recited in claim 1, wherein the block is configured for chemical delivery for use in semiconductor fabrication.

12. The modular chemical delivery block as recited in claim 1, wherein the top surface further comprises mounting holes for mounting said chemical control component.

13. The modular chemical delivery block as recited in claim 12, wherein the top surface comprises a seal interface, and wherein each of the pair of axial connection locations is located laterally between one of said mounting holes for mounting said chemical control component and said seal interface.

14. The modular chemical delivery block as recited in claim 2, wherein the mounting holes for said top-to-bottom fasteners are located along the same lateral centerline as mounting holes in the top surface for mounting said chemical control component.

15. The modular chemical delivery block as recited in claim 8, wherein the void is unobstructed by other portions of the modular chemical delivery block from the top surface and extends entirely through the modular chemical delivery block from top to bottom.

16. The modular chemical delivery block as recited in claim 2, wherein said mounting holes for receiving top-to-bottom fasteners are configured for mounting the modular chemical delivery block to a vertically adjacent chemical delivery block beneath the modular chemical delivery block.

17. The modular chemical delivery block as recited in claim 2, wherein said mounting holes for receiving top-to-bottom fasteners are configured for mounting the modular chemical delivery block to a vertically adjacent chemical delivery block above the modular chemical delivery block.

18. The modular chemical delivery block as recited in claim 17, wherein a distance between one of said pair of axial connection locations and another of said pair of axial connection locations is less than a distance between a first one of said mounting holes for receiving top-to-bottom fasteners and a second one of said mounting holes for receiving top-to-bottom fasteners.

19. The modular chemical delivery block as recited in claim 12, wherein a distance between one of said pair of axial connection locations and another of said pair of axial connection locations is less than a distance between a first one of said mounting holes for mounting said chemical control component and a second one of said mounting holes for mounting said chemical control component.

20. The modular chemical delivery block as recited in claim 4, wherein the modular block is configured to be mounted to the mounting palette with fasteners accessible from directly above the top surface.

21. A modular delivery block, comprising:

a bore hole for a delivery flow path; and at least one axial connection location for receiving a local side-to-side fastener for connecting the modular delivery block to another side-adjacent modular delivery block;

wherein the at least one axial connection location is configured so that the local side-to-side fastener is insertable and removable by access from directly above a top surface of the modular delivery block so that the modular delivery block is configured to be assembled with or removed from one or more other side-adjacent modular delivery blocks by access from only directly above the top surface; and wherein the modular delivery block is configured to mount to a vertically adjacent delivery block.

\* \* \* \* \*